July 11, 1961 T. W. BONNER ET AL 2,992,331
THREE ELEMENT TRIPLE COINCIDENCE COMPTON SPECTROMETER
Filed June 2, 1958 3 Sheets-Sheet 3

2,992,331
THREE ELEMENT TRIPLE COINCIDENCE
COMPTON SPECTROMETER
Tom W. Bonner, Houston, and William R. Mills, Dallas, Tex., assignors, by mesne assignments, to Socony Mobil Oil Company, Inc., New York, N.Y., a corporation of New York
Filed June 2, 1958, Ser. No. 739,079
14 Claims. (Cl. 250—71.5)

This invention relates to a gamma ray detector and more particularly to a detector which selectively will sense gamma rays converted by the Compton process.

In the analysis or study of radioactivity, scintillation-type systems have been developed in order that the energy as well as the intensity of a given type of radiation might be determined. It is known that gamma radiation may undergo conversion of several different types. In the use of a scintillation crystal, gamma radiation at energy levels greater than about 1 m.e.v. has been found to produce three different peaks in a spectrum, one peak being identified as resulting from photoelectric conversion. All three peaks are in part attributable to pair-conversion. One peak which is generally masked or otherwise blended or combined with all of the foregoing is attributable to Compton conversion of the gamma ray. The total spectrum is therefore not clearly definite of any one of the conversion processes.

Radiation measurements often must be made in the presence of high neutron flux with respect to which scintillation elements generally may be sensitive. Such characteristics increase the problem of properly identifying the detected radiation and emphasize the desirability of providing the necessary selectivity in a measuring system.

In accordance with the present invention there is provided a system in which the physical geometry and optical arrangement of a plurality of detecting elements are combined with an electrical system so that only gamma rays converted by the Compton process are measured. In one embodiment of the invention three scintillation-type crystals are employed in conjunction with a coincidence circuit and so operated that only Compton conversion of the gamma rays will actuate the sytsem.

In a more specific aspect of the invention, there is provided a detector system in which three scintillation crystals are positioned adjacent one another. In such configuration at least a portion of each crystal preferably is intersected by a given straight line. Each of the crystals is optically isolated from each other crystal. A first light sensitive detector means is optically coupled to all three of the crystals. A second light sensitive detector means is optically coupled only to a first of the crystals. A third light sensitive detector means is optically coupled only to a second of the crystals. A measuring system responsive to the output pulses of the first of the detectors only when such output pulses are coincident in time with output pulses from both the second and third detectors provides a measure of the Compton conversion of gamma radiation.

In a further aspect, a scintillation-type crystal of plastic material in the form of a right cylinder trisected along parallel planes forms three elements adapted to be positioned side-by-side. Thin light baffles between the adjacent faces of the elements provide optical isolation therebetween. A first photomultiplier tube positioned adjacent one end of the crystal is responsive to light scintillation in all three elements. A second photomultiplier tube positioned adjacent the opposite end of the crystal and suitably light-stopped is sensitive to light scintillation in only a first of the three elements. A third photomultiplier tube positioned at said opposite end of said crystal and similarly light-stopped is sensitive to light scintillation only in a second of the three elements. A detecting system provided with suitable coincidence functions and with a measuring means at its output measures only those pulses from the one of the photomultiplier tubes which are coincident with output pulses from the other two of the photomultiplier tubes.

For a more complete understanding of the present invention and for further objects and advantages thereof, reference may now be had to the following description taken in conjunction with the accompanying drawings in which:

FIG. 1 schematically represents a well logging system embodying a detector of the present invention;

Figure 1:
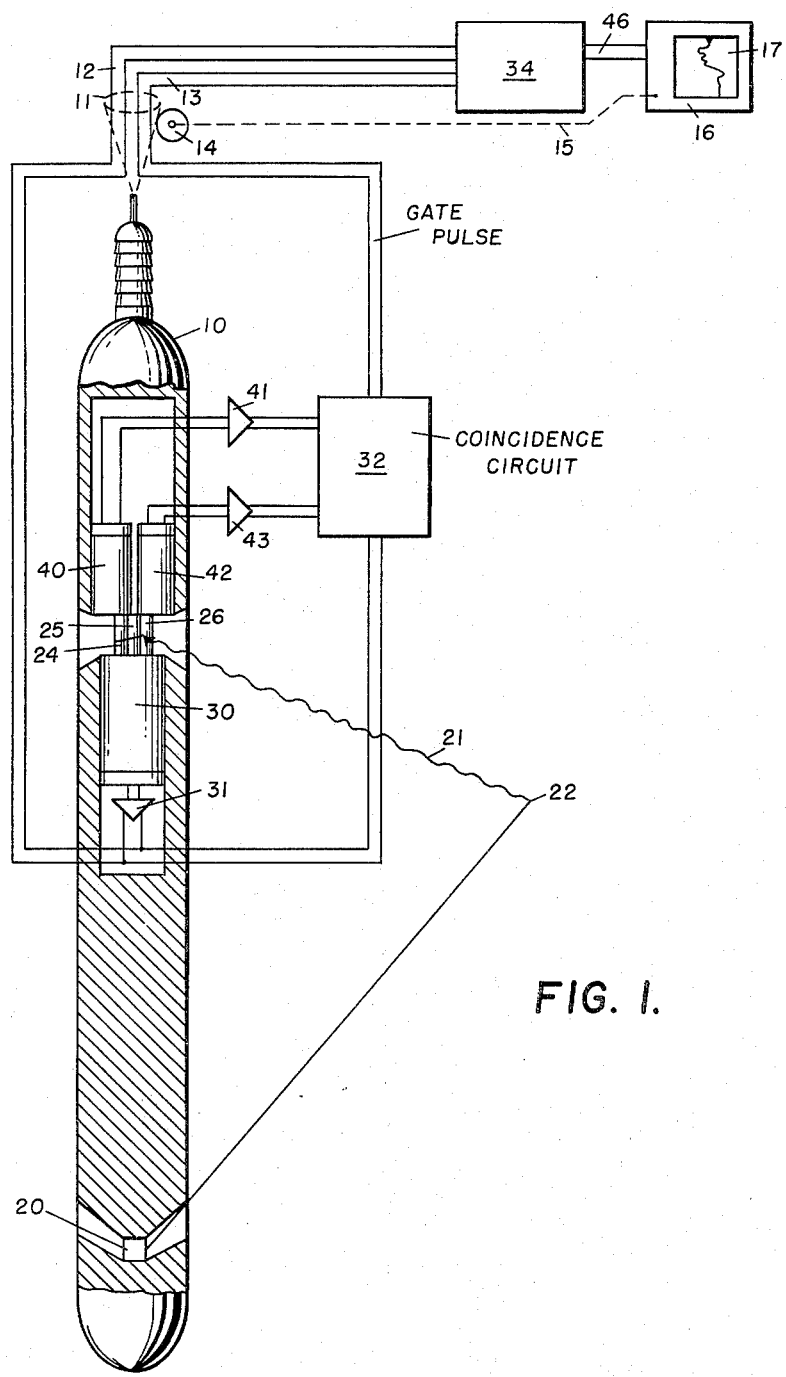

Referring to FIG. 1, there is illustrated a three crystal Compton spectrometer employed as a detector for gamma radiation in a well logging system. While the invention has utility for gamma ray detection other than in connection with well logging, the geometry is particularly adaptable to such an application and for this reason only it has been employed for purpose of illustration. Other modifications, of course, will be apparent to those skilled in the art.

An exploring unit 10, FIG. 1, is adapted to be moved along the well bore, being supported by a cable generically represented by cable 11 which includes a strain member for support (not shown) and two signal channels 12 and 13. Such signal channels may be physically separate as shown in FIG. 1 or may be provided by other telemetering means which will accommodate data of the type hereinafter described.

In order to produce a "log" of measurements made as unit 10 is moved along or positioned at different levels in the well bore, the position of the unit 10 in a given borehole is sensed by a measuring sheave or wheel 14 which is coupled by linkage 15 to a recorder 16 so that the length of the recorder chart 17 will be proportional to depth in the well bore.

A suitable radiation source 20, which may be of the neutron type, is supported at the lower end of unit 10 with suitable ports extending therefrom so that neutrons may irradiate the adjacent media. Assume for the purpose of this description that a gamma ray identified by the line 21 is produced upon a reaction at point 22. The gamma ray impinges a detector system which includes three crystal elements 24, 25 and 26. The crystal elements are mounted to receive radiations from a substantial angle in the medium adjacent the unit 10. The crystals 24–26 preferably are of the plastic or organic scintillation type in which light scintillations will be produced upon bombardment thereof by various types of radiation.

A first photoelectric multiplier 30 is positioned adjacent the lower end of the crystals 24–26 and is responsive to light scintillation in any one or all of the crystals 24–26. As well understood, electrical pulses are generated by the photo-multiplier tube 30 in response to light scintillations. Such electrical pulses are then transmitted by way of an amplifier 31 to a coincidence circuit 32. Any output signals from the coincidence circuit 32 will be transmitted by way of channel 13 in cable 11 to a gating circuit 34 which is positioned at the earth's surface.

A second photomultiplier tube 40 is positioned adjacent the upper ends of the crystal elements 24–26 and is so baffled or shielded by a light stop as to be responsive only to light scintillations in the crystal 24. The output of photomultiplier tube 40 is connected by way of an amplifier 41 to the coincidence circuit 32.

A third photomultiplier tube 42 is positioned adjacent the photomultiplier tube 4 and is so arranged as to be responsive only to light scintillations in the crystal 26. Photomultiplier tube 42 is connected by way of amplifier 43 to the coincidence circuit 32.

Crystals 24–26 are optically isolated one from another as will hereinafter be explained in more detail. However, they are so oriented that at least one straight line path or trajectory will intersect all three crystals. Preferably, many different linear paths are provided for most efficient operation. When such an arrangement is provided, gamma ray converted by the Compton process will produce a recoil electron which, traveling along a straight line such as line 45 (FIG. 2) through all three of the crystals 24–26, produces light scintillations in each crystal. When this is the case, an output pulse will be applied to each of amplifiers 31, 41 and 43 (FIG. 1). The coincidence circuit 32 is arranged to generate an output condition, such as transmission of a pulse from amplifier 31 to channel 13, only when there is coincidence between the outputs from amplifiers 31, 41 and 43.

In one embodiment such an output pulse resulting from triple coincidence was employed to provide a gating pulse which, after transmission uphole, served to control the gating unit 34. When light scintillations occur in only one or in only two of the crystals 24–26, then the coincidence circuit 32 will prevent the transmission of a gating pulse to the surface unit. It will be apparent that the entire pulse selecting function may be carried out downhole in circuit 32. However, the system of FIG. 1 has been adopted for purposes of the present illustration only to emphasize the aspect of triple coincidence required to ascribe a given signal to a Compton recoil electron.

In accordance with the present invention, it is an object to provide for measurement of the energy and/or intensity of that portion of the gamma radiation which is converted by the Compton process. This provides a unique and distinctive measure of gamma radiation uninhibited or masked or otherwise rendered ambiguous by other types of radiation which may produce scintillation in a scintillation detector where the conventional methods of measurement are employed. For example, a neutron impinging the detector might lose some or all of its energy by colliding with a proton in one of the crystals. The proton would have a very short trajectory so short as to be substantially less than any travel path which would extend through any two of the crystals 24–26. When such is the case, light scintillations occurring in one or two of the crystals would not open the coincidence circuit for the transmission of a gating pulse to the surface system.

Electrical impulses appearing at the output of the amplifier 31 are transmitted by way of cable channel 12 to the second input of the gate unit 34. When signals are applied in coincidence over channels 12 and 13, the signal on channel 12 will be suitably amplified and applied by way of channel 46 to the recorder 16. By this means, in the illustrated application of the invention, a selective log of a particular form of radiation may be obtained.

Figure 2:
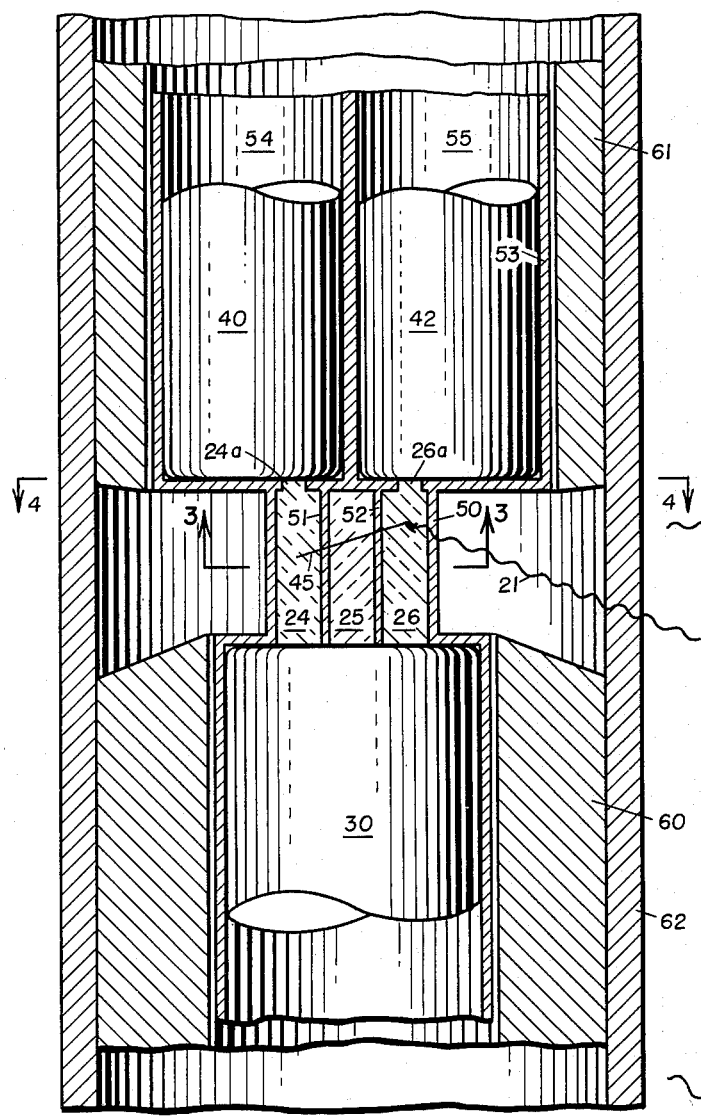
FIG. 2 is an enlarged longitudinal view, partially in section, of a portion of the detector elements shown in FIG. 1.
Figure 3:
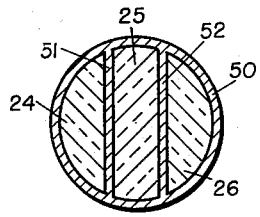
FIG. 3 is a reduced sectional view of FIG. 2 taken along the line 3—3 of FIG. 2.
Figure 5:
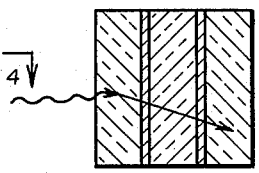
FIG. 5 illustrates a modification of the crystal structure.
Figure 6:
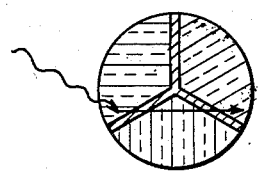
FIG. 6 illustrates a further modification of the crystal structure.

The physical process upon which the present invention is based may more readily be understood by referring to FIGS. 2 and 3. The enlarged view of FIG. 2 is a fragmentary sectional view of unit 10 taken along the axis thereof. Where consistent, like parts have been given the same reference characters as in FIG. 1.

The sensing zone, comprising crystals 24, 25 and 26, is in the form of a right cylinder as seen in FIG. 3. The crystals, generally plano-cylindrical in form, are shown housed in a suitable thin casing 50 such as aluminum. Casing 50 also houses the first photoelectric multiplier 30. Photoelectric multiplier 30 is positioned with the end thereof in an abutting relation with respect to the ends of all three of the crystals 24, 25 and 26 in order that it may be responsive to light scintillations in any one or all of the crystals.

The crystal elements 24–26 are optically isolated one from another by means of baffles. More particularly, a baffle 51 is positioned between the adjacent faces of crystals 24 and 25. Similarly, a baffle 52 is positioned between the adjacent faces of crystals 25 and 26. Baffles 51 and 52 were formed of aluminum sheet 0.001" thick.

A second casing or housing 53, which may be either integral with or separate from housing 50, is provided with two compartments 54 and 55. A second photomultiplier tube 40 is positioned in compartment 54. A third photomultiplier tube 42 is positioned in the compartment 55. The lower end of compartment 54 is provided with an aperture into which a disk-like portion 24a of the crystal element 24 extends. By this means the crystal element 24 will be adjacent to the end of the photomultiplier tube 40. Similarly, the lower end member of compartment 55 is provided with an aperture into which there extends a disk-like portion 26a of crystal element 26. By this means the end of the photomultiplier tube 42 will be adjacent to crystal element 26.

In FIG. 3 is will be seen that in cylindrical form the three crystals are of substantially equal maximum thickness.

Figure 4:
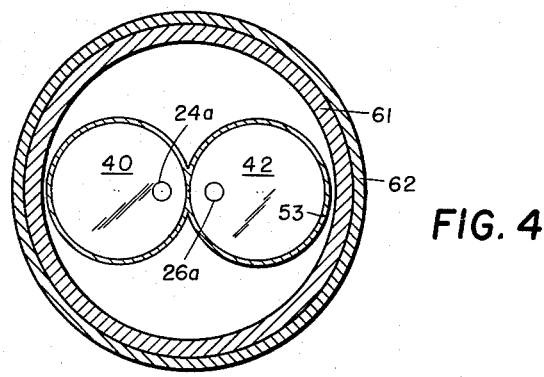
FIG. 4 is a reduced sectional view of FIG. 2 taken along the line 4—4 of FIG. 2.

Referring to FIG. 4, it will be noted that the disks 24a and 26a, which are integral parts of crystals 24 and 26, FIG. 1, are positioned eccentrically with respect to the photomultiplier tubes 40 and 42. This geometry was selected so that light would enter the tubes 40 and 42 nearer the center of the photomultiplier face proper. The disks 24a and 26a were provided as to have an area of about one-tenth the cross-sectional area of crystals 24 and 26, respectively. The principal reason for the foregoing relationship was to reduce the effect of Compton recoil electrons passing through the crystal structure over paths located different distances from the upper end of the crystal. More particularly, if tubes 40 and 42 viewed the entire face of crystals 24 and 26, respectively, large amounts of light might pass through the upper ends of the crystal. If this happens, the amount of light that passes into tube 30 will not be constant for constant energy loss by Compton electrons in the composite crystal. For example if a Compton electron travels through the upper portion of the crystal, it will appear to have less energy than if it passes through the lower portion thereof simply because more light gets to tube 30 in the latter case. By allowing tubes 40 and 42 to accept only a small portion of the light from crystals 24 and 26, the latter effect may be found to be substantially reduced.

In the embodiment of the invention illustrated in FIGS. 1–4, the geometry contemplated the selective measurement of gamma radiation in the order of about 4.5 m.e.v. In this case the maximum thickness of each of the crystals 24–26 was about one centimeter. This dimension was selected in order that an electron produced upon gamma ray conversion by the Compton process would have a high probability of following a trajectory which would encompass at least a part of each of the crystals. When this occurs, a sensible indication would be transmitted through the gate 34 to the measuring system.

In the embodiment of the invention shown in FIG. 1, the crystal elements 24–26 were formed by trisecting a right cylinder of a plastic, organic scintillator which was three centimeters in diameter and three centimeters long. The plastic, organic scintillator is of the type manufactured by Pilot Chemical Company of Watertown, Massachusetts, and identified as "Pilot Plastic Scintillator B." The photoelectric multiplier tube 30 was of the type sold by Radio Corporation of America, Tube Division, of Harrison, New Jersey, type 6655, while the photoelectric multiplier tubes 40 and 42 were of the type 6199 available from the same source.

Shielding elements 60 and 61 of heavy metal were formed around the photomultiplier tubes. Lead, tungsten or stainless steel may be so employed. The housing comprises a stainless steel casing 62 having a thickness primarily determined by the working pressures in the environment in which the system is to be operated. For deep well logging, the wall thickness would be of the order of 1/4" to 3/8". Baffles 51 and 52 were formed of aluminum foil though any thin, opaque substance would serve so long as it provides optical isolation of the units 24, 25 and 26 and does not materially impede electrons produced by Compton conversion.

It is recognized that other multi-crystal spectrometers exist for laboratory use, there being in existence two crystal Compton and three crystal pair spectrometers. However, the Compton process upon which the present system is based provides a new and novel method and system for the detection of gamma radiation. Gamma radiation impinging upon a crystal undergoes a Compton scattering or collision therein, producing a Compton electron of energy $E_1$. The dimensions of the crystals are selected such that the range of the electrons produced by conversion of the gamma radiation of maximum energy of interest is equal to the sum of the thickness of the central crystal element and one of the other crystal elements. The thickness of the center crystal element would determine the other end of the energy range and should be equal to the range of an electron produced by a gamma ray of the minimum energy of interest.

The material from which the scintillation elements are formed may be materials other than the plastic scintillator above-identified so long as the thicknesses thereof are determined by the ranges of Compton electrons of interest in such material as determined by the energy of the gamma radiations to be detected. Similarly, the crystal thickness and heights may be varied over wide limits in order to accommodate other gamma ray energies.

A Compton electron which begins in crystal 26 may travel through crystal 25 as along path 45, FIG. 2, and will be completely dissipated in crystal 24. Since the Compton electron continuously loses energy as it progresses through the crystals, scintillations are produced in each of the crystals. The resulting pulse produced by the first photomultiplier tube 30 will correspond with the full energy of the Compton electron. Therefore, the signal which appears at the output of the photomultiplier tube 30 preferably will be transmitted by way of channel 12 to the surface recording system.

It will be appreciated that the requirement of a triple coincidence registration of any pulse would have the effect of reducing to a negligible level any direct neutron sensitivity of the counter. This provides a distinct advantage over a single crystal spectrometer. For this reason a minimum of shielding will be necessary, which feature allows the spectrometer to be placed close to a combined source of neutrons and gamma rays. Thus, it is a valuable tool from a laboratory standpoint as well as the well logging application specifically described herein. The solid angle through which gamma radiation may be accepted may be made comparable to that possible when using a single crystal detector and thus the present three crystal Compton spectrometer is substantially superior to other two crystal or three crystal spectrometers where a substantially smaller solid angle necessarily is involved.

Figure 7:
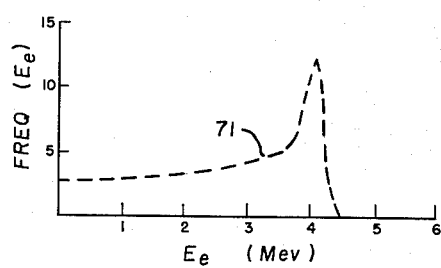
FIG. 7 is a plot of the response of one embodiment of the invention to 4.5 m.e.v. gamma rays.

It has been found that the pulse height distribution of energy from Compton electrons detected by a system of the present type is structurally less complex than that obtained from a single crystal spectrometer of the customary NaI type. The electron energy produced from 4.5 m.e.v. gamma radiation in such single crystal spectrometers will have a distribution which exhibits three peaks, namely, pair production peaks and a photoelectric peak, all superimposed on a Compton distribution. In contrast, a relatively simple spectrum of Compton distribution is observed at the output of the present system and may be of the form generally represented by line 71, FIG. 7.

More specifically, line 71 illustrates a plot of the frequency or number of pulses impinging a detector versus the magnitude of the pulse produced by the detector of the present invention when in a field of 4.5 m.e.v. gamma radiation. It will be readily apparent that the detector may be made to be highly selective to a particular band of gamma ray energies. When it is known that the preponderance of the detected pulses is due to electrons produced by Compton scattering, then the relationship between the energy of electrons and the energy of the incident gamma ray producing such electrons may readily be determined. In other words, knowing that the pulses are produced from Compton scattering and knowing the energy of such electrons, then one may compute the energy of the incident gamma rays.

Figure 8:
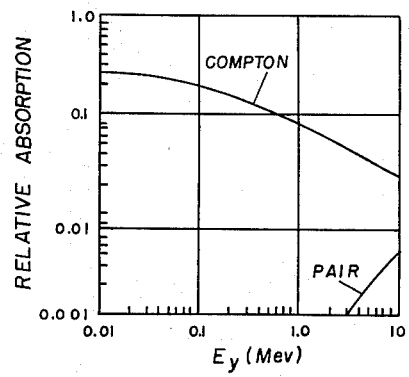
FIG. 8 is a graph showing the relative sensitivity of the system embodied in the present invention for detecting Compton scattered gamma radiation of different quantum energies.

In FIG. 8 there has been illustrated a graph which shows the gamma ray absorption coefficients for a plastic scintillator generally of the type herein employed. It will be noted that in the energy range of from 2 to 10 m.e.v. the probability of gamma ray absorption by the Compton process is higher than that by pair production by a factor which has a minimum value at 10 m.e.v. of about 4 and a value at 3 m.e.v. of about 55 so that the possibility of triple coincidence occurring by reason of pair production upon gamma ray conversion is substantially lower than the probability of Compton conversion and thus the present invention is particularly suitable for providing a singular indication of the energy and intensity of gamma radiation.

Figure 9:
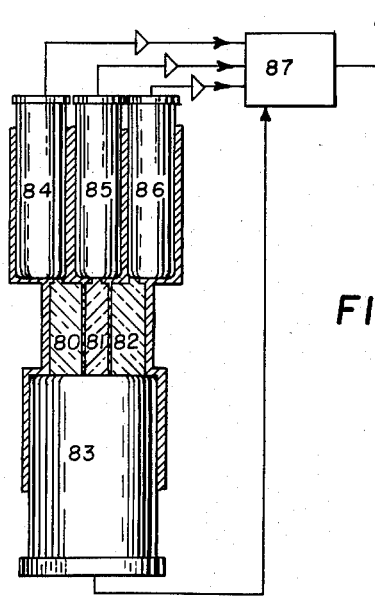
FIG. 9 illustrates a further embodiment of the invention.

Referring to FIG. 9, there is illustrated a further modification of the invention in which three scintillometer crystals 80, 81 and 82 are provided with substantially different thicknesses so that the detector will be responsive to any gamma radiation energy within a given band of energies. The upper limit of this band corresponds with the length of trajectory of a Compton electron equal to the combined thicknesses of the crystals 80 and 81 or 81 and 82. The lower limit of this band corresponds with the length of trajectory of a Compton electron which is just greater than the thickness of the center crystal 81.

In this embodiment of the invention photomultiplier tube 83 is so arranged as to be responsive to light scintillations in all three of the crystals 80–82. Three photomultiplier tubes 84, 85 and 86 are responsive to light scintillations in crystals 80, 81 and 82, respectively. Suitable light baffling is provided as above explained so that the photomultiplier tubes 84–86 are singularly responsive to but one of the crystals. The outputs of the photomultiplier tubes 84–86 are separately applied to three inputs of a triple coincidence circuit 87. The output of coincidence circuit 87 may then be connected to a signal channel such as channel 13, FIG. 1. The output of tube 83 may be connected to a signal channel such as signal channel 12 of FIG. 1 for selectively measuring the output signals from tube 83 which occur in time coincidence with a signal appearing in all three of tubes 84–86.

It may be found desirable to utilize an arrangement such as illustrated in FIG. 9 in order to provide a more definite rejection of the effects due to neutron interactions in the crystal detector.

From the foregoing it will be seen that the present invention involves the separate sensing of light scintillations in at least two of three fractional parts of a sensing zone, the sensing zone being made up substantially entirely of the three fractional parts, for the production of signal components which include representations of the conversion of particle kinetic energy into light energy along at least one straight line path or trajectory extending through a sensing zone. Light scintillations in all of the zones are sensed to produce signal pulses which are then selectively transmitted for measurement only when they coincide in time with scintillations sensed in the two selected fractional parts of the sensing zone.

While the invention has been described in connection with certain specific embodiments thereof, it will now be understood that further modifications will suggest themselves to those skilled in the art and it is intended to cover such modifications as fall within the scope of the appended claims.

What is claimed is:

1. A system for measuring gamma radiation in the presence of neutron flux which comprises means for separately sensing light scintillations which occur in three fractional parts of a sensing zone consisting substantially entirely of said parts wherein said scintillations are representative of radiation entering said zone and including components representative of conversion of particle kinetic energy into light energy along at least one straight line trajectory extending through said zone, means for selectively producing conditions representative in time and magnitude of the sum of the scintillations in all three of said fractional parts of said zone, and means for measuring said conditions.

2. A system for measuring gamma radiation in the presence of neutron flux which comprises means for generating a first and a second set of time-spaced pulses respectively representative of radiations entering two of three separate fractional parts of a sensing zone consisting substantially entirely of said parts, means for generating a third set of time-spaced pulses representative of radiations entering any part of said zone, said first, second, and third set of pulses including components representative of conversion of particle kinetic energy along at least one straight line trajectory extending through said zone, means for selectively producing conditions representative in time and magnitude of those pulses from said third set of pulses which are coincident in time with pulses in all sets of said pulses, and means for measuring said conditions.

3. A system for measuring gamma radiation in the presence of neutron flux which comprises three scintillation-type crystals positioned adjacent each other such that scintillations will be produced in each of said crystals representative of conversion of particle kinetic energy into light energy along at least one straight line trajectory extending through said crystals, a first and a second means for separately sensing said scintillations which occur in at least two of said three scintillation crystals, a third means for sensing said scintillations which occur in all of said crystals, means for selectively producing conditions representative in time and magnitude of those scintillations sensed by said third means which are coincident in time with the scintillations sensed by both said first and second means, and means for measuring said conditions.

4. The combination set forth in claim 3 in which the central crystal element has a thickness substantially less than the thickness of either of the other two crystals.

5. A system for measuring gamma radiation in the presence of neutron flux which comprises three scintillation-type crystals separated one from another by an opaque sheet material of the order of .001" thick optically to mask said crystals from one another while minimizing the impediment to travel of electrons from one of said crystals to the other such that scintillations will be produced in each of said crystals representative of conversion of electron kinetic energy into light energy along at least one straight line trajectory extending through said crystals, a first and second means for separately sensing said scintillations which occur in at least two of said three scintillation crystals, a third means for sensing said scintillations which occur in all three of said crystals, means for selectively producing conditions representative in time and magnitude of those scintillations sensed by said third means which are coincident in time with the scintillations sensed by both said first and second means, and means for measuring said conditions.

6. A system for detecting gamma radiation in the presence of neutron flux comprising three detector elements positioned adjacent each other such that each will be intersected by at least one straight line and each adapted for production of an electron therein upon Compton scattering of gamma radiation, means including a triple coincidence circuit responsive to scintillations in each of said elements for producing output control pulses upon coincidence of scintillations in all three of said elements, measuring means responsive to signals from all of said elements and connected to said coincidence circuit and adapted to be rendered operable in response to said control pulses for the measurement of each pulse in said signals which occurs coincident with one of said control pulses.

7. A system for detecting gamma radiation in the presence of neutron flux which comprises three crystal detector elements forming a right cylinder and so shaped that all three elements will be intersected by a given straight line and each adapted for the production of an electron therein upon Compton scattering of a gamma ray, means including a triple coincidence circuit responsive to all three of said elements for producing output control pulses upon coincidence of signals from all said elements, measuring means responsive to all of said elements for producing signal pulses and connected to said coincidence circuit and adapted to be rendered operable in response to said control pulses for measurement of each signal pulse which occurs coincidentally with one of said control pulses.

8. A system for detecting gamma radiation in the presence of neutron flux which comprises three crystal scintillation elements forming a right cylinder and each so formed and supported as to be intersected by a given straight line and each adapted for the production of an electron therein upon Compton scattering of a gamma ray, a photomultiplier adapted to be responsive to light scintillations in all three of said crystal elements, a second photomultiplier adapted to be responsive to light scintillations in one of said elements, a third photomultiplier adapted to be responsive to light scintillations in a second of said elements, measuring means connected to one of the photomultipliers, and means including a coincidence circuit for generating control pulses upon coincidence of light scintillations in all three of said elements for rendering said measuring means operable to measure each pulse from said one of the photomultipliers which occurs coincident with one of said control pulses.

9. A system for detecting gamma radiation which comprises three scintillator elements positioned in side-by-side relation, means for optically isolating said scintillator elements one from the other, photomultiplier tubes disposed adjacent the one end of each of at least two of said elements and adapted separately to detect light scintillations therein, a photomultiplier tube adjacent the ends of said elements opposite said first-named photomultiplier tubes and adapted to detect light scintillations in all of said elements, and means connected to said photomultiplier tubes for selectively measuring time-spaced pulses corresponding in time and magnitude with total light scintillations in all of said elements at instants when light scintillations are coincident in all three of said elements.

10. A system for detecting gamma radiation comprising three scintillation detector elements positioned adjacent each other, housing means for said detector elements including baffles optically to isolate said elements one from another and covering one end of each of said elements, said baffles including restricted apertures adjacent the ends of two of said elements, a first photomultiplier means positioned with the photosensitive surface thereof facing one of said apertures for generating signals dependent upon light scintillations in one of said two elements, a second photomultiplier means positioned with the photosensitive surface thereof facing a second of said apertures for generating signals dependent upon light scintillations in a second of said two elements, a third photomultiplier means positioned adjacent the ends of said elements opposite said first and second photomultiplier means and responsive to light scintillations in all of said elements, a coincidence circuit adapted to transmit only those pulses generated by said third photomultiplier means which are in time coincidence with pulses in signals from said first and second photomultiplier means, and means for measuring the transmitted pulses.

11. The combination set forth in claim 10 in which said apertures are of an area equal to about one-tenth the area of the end of the adjacent scintillator crystal.

12. The combination set forth in claim 10 in which said baffles comprise thin aluminum sheet.

13. A system for detecting gamma radiation in the presence of neutron flux which comprises a scintillator in the form of a right cylinder, baffle means for separating said right cylinder into three plano-cylindrical elements having planar faces parallel to the axis of said cylinder and optically isolated one from the other, a first light-tight housing adjacent a first end of said elements, a first photosensitive means in said first housing optically coupled to all three of said elements for generating output pulses representative in time and magntiude of light scintillations produced in said elements, a second light-tight housing adjacent the opposite end of one of said elements, said second housing having an aperture therein into which at least a portion of said one of said elements extends, a second photosensitive means in said second housing adapted to generate output pulses representative in time and magnitude of light scintillations produced in said one of said elements, a third light-tight housing adjacent the opposite end of a second of said elements, said third housing having an aperture therein into which at least a portion of said second of said elements extends, and a third photosensitive means in said third housing adapted to generate output pulses representative in time and magnitude of light scintillations produced in said second of said elements, measuring means, and a signal channel interconnecting said first photosensitive means and said measuring means and including a coincidence circuit connected to said second and third photosensitive means for transmitting only those pulses to said measuring means from said first photosensitive means which occur in time coincidence with pulses from said second and third photosenstiive means.

14. A system for detecting gamma radiation which comprises means for separately sensing light scintillations which occur in three adjacent fractional parts of a sensing zone consisting substantially entirely of said parts, where said scintillations are representative of radiations entering said zone and including components representative of conversion of particle kinetic energy into light energy along at least one trajectory extending through said zone, means for selectively producing conditions representative in time and magnitude of those scintillations in at least one of said fractional parts of said zone which are coincident in time with scintillations in all three of said fractional parts of said zone, and means for measuring said conditions.

References Cited in the file of this patent

UNITED STATES PATENTS

| 2,725,485 | Scherbatskoy | Nov. 28, 1955 |
| 2,830,185 | Scherbatskoy | Apr. 8, 1958 |
| 2,830,187 | Scherbatskoy | Apr. 8, 1958 |
| 2,830,188 | Scherbatskoy | Apr. 8, 1958 |

OTHER REFERENCES

Today's Pulse Height Analyzers, by Higinbotham, published in Nucleonics, vol. 14, No. 4, April 1956, pages 61 to 64.

UNITED STATES PATENT OFFICE

CERTIFICATE OF CORRECTION

Patent No. 2,992,331　　　　　　　　　　　　　　　　July 11, 1961

Tom W. Bonner et al.

It is hereby certified that error appears in the above numbered patent requiring correction and that the said Letters Patent should read as corrected below.

Column 1, line 27, for "definite" read -- definitive --; line 43, for "sytsem" read -- system --; column 3, line 2, for "photo-multiplier" read -- photomultiplier --; line 16, for "4" read -- 40 --; column 4, line 37, for "is" read -- it --; column 10, line 20, for "photosenstiive" read -- photosensitive --.

Signed and sealed this 23rd day of January 1962.

(SEAL)
Attest:

ERNEST W. SWIDER　　　　　　　　　　　　　　　　DAVID L. LADD
Attesting Officer　　　　　　　　　　　　　　　　Commissioner of Patents